United States Patent
Seiberle et al.

(10) Patent No.: US 6,496,287 B1
(45) Date of Patent: Dec. 17, 2002

(54) OPTICAL IDENTIFICATION ELEMENT

(75) Inventors: Hubert Seiberle, Weil am Rhein (DE); Franco Moia, Frenkendorf (CH); Martin Schadt, Seltisberg (CH)

(73) Assignee: Rolic AG, Zug (CH)

( * ) Notice: Subject to any disclaimer, the term of this patent is extended or adjusted under 35 U.S.C. 154(b) by 0 days.

(21) Appl. No.: 09/647,717

(22) PCT Filed: Apr. 4, 1999

(86) PCT No.: PCT/IB99/00590

§ 371 (c)(1), (2), (4) Date: Oct. 4, 2000

(87) PCT Pub. No.: WO99/53349

PCT Pub. Date: Oct. 21, 1999

(30) Foreign Application Priority Data

Jul. 9, 1998 (CH) ................................................ 841/98

(51) Int. Cl.$^7$ ................................................ G02B 5/32
(52) U.S. Cl. .............................. 359/15; 359/2; 359/489; 349/113; 349/129; 349/127
(58) Field of Search ........................ 359/1, 2, 15, 489; 349/113, 117, 129, 127

(56) References Cited

U.S. PATENT DOCUMENTS

| | | | |
|---|---|---|---|
| 5,691,790 A | * 11/1997 | Havens et al. | 349/113 |
| 5,694,229 A | 12/1997 | Drinkwater et al. | |
| 5,721,630 A | 2/1998 | Horner et al. | |
| 5,903,330 A | * 5/1999 | Funfschilling et al. | 349/129 |
| 6,144,428 A | * 11/2000 | Schadt et al. | 349/113 |
| 6,160,597 A | * 12/2000 | Schadt et al. | 349/98 |

FOREIGN PATENT DOCUMENTS

| | | |
|---|---|---|
| EP | 0 689 065 A1 | 12/1995 |
| EP | 0 689 084 A1 | 12/1995 |
| EP | 0 772 069 A1 | 5/1997 |
| WO | WO 95/12826 | 5/1995 |

\* cited by examiner

*Primary Examiner*—Cassandra Spyrou
*Assistant Examiner*—Fayez Assaf
(74) *Attorney, Agent, or Firm*—Finnegan, Henderson, Farabow, Garrett & Dunner, LLP

(57) ABSTRACT

An optical component in the form of an identification element (such as for counterfeit protection or copy protection) includes an optically anisotropic layer comprising regions of different optical axes that is arranged over a reflector. The anisotropic layer may be implemented with a liquid crystal polymer in which the orientation of the liquid crystals is different in different areas. Such an orientation pattern is initially hidden from a viewer, but becomes visible by means of an additional polariser. To improve the visual appearance of the identification element, a white light hologram may be used for the reflector.

8 Claims, 1 Drawing Sheet

OPTICAL IDENTIFICATION ELEMENT

Figure 1:
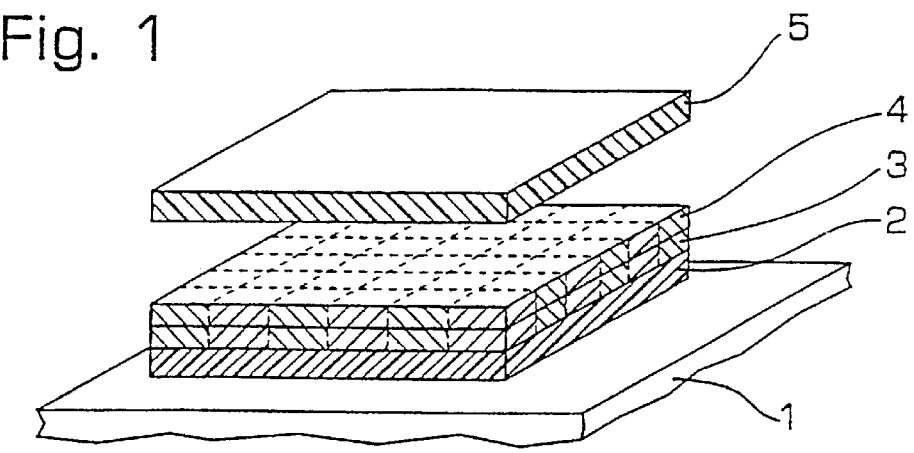

The invention relates to an optical identification element, especially for counterfeit protection and copy protection, comprising at least one optically anisotropic layer, which has at least two regions having different preferred directions, and a layer that is at least partially reflective.

The demands made of the protection of items such as banknotes credit cards, securities, identity cards and the like against counterfeiting are constantly increasing as a result of the availability of high quality copying techniques. In addition, pirated copies of branded products, such as compact discs. computer software, electronic chips and so on, are increasingly being produced and distributed worldwide. On account of the growing number of instances of counterfeiting there is accordingly a great need for new, counterfeit-protected elements that can be identified both visually and by machine.

In recent years, new types of counterfeit-protected identification elements that utilise liquid crystals and associated optical effects have become known. Examples thereof are described in EP-A-0 689 065 and WO-A-98/52077, the disclosures of which are hereby incorporated by reference.

Such identification elements are based on a hybrid layer structure which comprises a layer having molecules that are fixed (crosslinked) in the liquid-crystalline state, which layer is optically anisotropic and usually acts as an optical retarder. In the production of that layer the orientation of the liquid crystal molecules can be preset to be different in different areas, preferably by means of a correspondingly structured orientation layer, such as can be produced, for example, from a linearly photopolymerised polymer network. The result is an optically structured, fixed liquid crystal layer having an orientation pattern that has been determined in advance. When viewed without an additional aid, the orientation pattern, i.e. the information thus recorded in the liquid crystal layer, is initially invisible. The layers appear in this case to be transparent. The orientation pattern becomes visible only when the identification element is placed between two polarisers.

In especially suitable arrangements of such counterfeit-protected identification elements, the optically structured liquid crystal layer is located over a reflective background. This makes it possible for the orientation pattern, i.e. the corresponding information, to be rendered visible using only one polariser which is held above the element.

As the reflective background (referred to hereinafter as the reflector) there have been used hitherto materials such as diffuse or mirroring metal surfaces, reflective lacquers, reflective paper or the like. In that case the mode of operation of the identification elements usually requires the incident light to retain its polarisation state, at least to a certain extent, on reflection at the reflector.

A disadvantage of the reflectors known hither to for the said identification elements is that brightness and contrast are lost to a comparatively great extent on reflection.

According to the invention it is therefore proposed to use a holographic reflector. This type of reflector, known per se, reflect (and focuses) the ambient light into a predetermined cone of diffuse light and thus produces a substantial increase in brightness in the region of the cone. At the same time, dazzling reflections (glare) are largely avoided and an excellent brightness distribution is obtained. In addition, the polarisation is almost completely retained. These properties bring about a crucial improvement in the visual appearance of the identification elements, which is important both for the actual identification and its ability to be discerned and for market acceptance. Thus, according to the invention, there is provided optical identification element, especially for counterfeit protection and copy protection, comprising at least one optically anisotropic layer , which has at least two regions having different preferred directions, and a layer that is at least partially reflective, characterised in that the at least partially reflective layer is a holographic reflector.

Surprisingly, tests have shown that holographic reflectors, despite their complex structure, do not have an adverse effect on the mode of action of the identification element, which will usually likewise be of comparatively complex structure.

The reflector is preferably based on an achromatic, or white light, hologram, that is to say the predetermined cone of diffuse light produced by the holographic reflector is substantially white.

For the sake of simplicity the opening explanation, of the structure and principle of operation of counterfeit-protected identification elements having an optically structured, fixed liquid crystal layer was limited to basic principles. However, a large number of arrangements that are more complex in terms of structure and optical mode of action exist, some of which are described in the publications mentioned above, and it is possible to imagine other arrangements operating in accordance with the same basic principles. For example, it is possible additionally to integrate one or more polariser layers, for example in the form of a liquid crystal layer containing dichroitic dyes or in the form of a conventional polarisation film, it also being possible for a polariser to contribute to the information recorded in the element when the polarisation properties are different in different areas. Also possible are combinations of two or more information-carrying liquid crystal layers and optionally associated polariser layers, or alternatively configurations having cholesteric filters, especially for producing different colours. It will be clear to the person skilled in the art that all those arrangements and similar arrangements of counterfeit-protected identification elements, where they are used in reflection, will benefit from the above-mentioned advantages and are covered by the present invention.

According to a special embodiment of the invention, the holographic reflector is transflective or partially transparent. This enables, for example, an identification element according to the invention to be mounted over a visible feature, which nevertheless remains visible as a result of the partial transparency of the reflector.

Preferably, the optically anisotropic layer is formed with liquid crystal molecules that are substantially fixed in their orientation. The layer may be formed with a layer of crosslinked liquid-crystalline monomers, oligomers or polymers. An orientation layer may be provided for this liquid crystal molecules, preferably formed from a linearly photopolymerised polymer network.

The invention extends to an item such as a banknote or identity card with protection against forgery and/or copying, characterised by an optical identification element as set forth above.

A method of checking such an element for authenticity may comprise passing light through a polariser onto the optical component and viewing the reflected light from this layer through the polariser.

Figure 2:
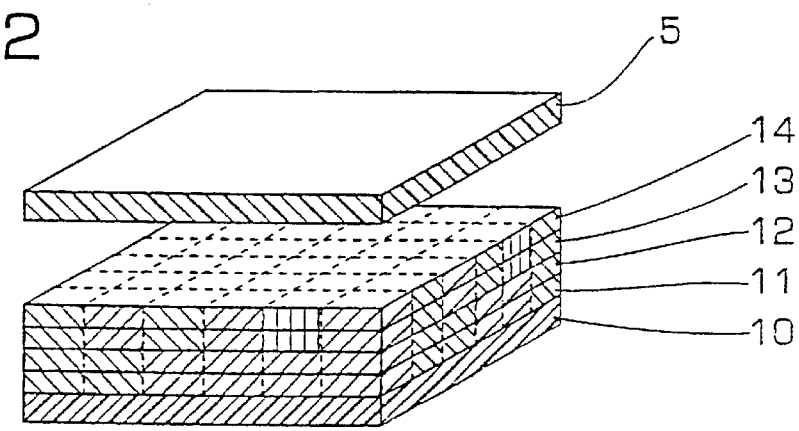
Figure 3:
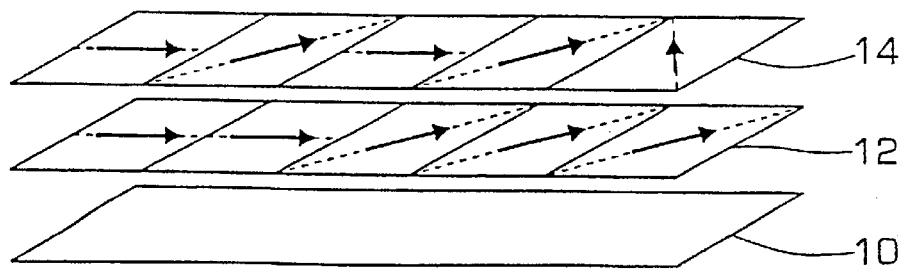

The invention will now be described by way of example, by the following embodiments. The accompanying drawings show, in simplified form, FIG. 1 an identification element according to the invention;

FIG. 2 a further variant of a layer structure for an identification element according to the invention, and FIG. 3 a diagram showing various possible combinations of the orientation of the optical axes in the retarder layers of FIG. 2.

FIG. 1 shows diagrammatically a cut-away view of a layer structure (2, 3, 4) of an identification element according to the invention which is arranged on an article to be protected against counterfeiting or illegal copying, for example on a banknote. The height of the element is shown exaggerated; it is usually only a few tens of micro-metres. The base or substrate of the layer structure is a paper layer 1 which, in the case of a banknote, will be identical with the banknote paper. In a certain region of the paper there is a reflector 2. Mounted on the reflector is an orientation layer 3 on which in turn a retarder layer 4 is mounted. The retarder layer 4 has regions having different optical axes (indicated by rectangular divisions in the Figure) which form an orientation pattern. When the configuration is viewed through a (separate) polarisation filter 5, the pattern becomes visible.

The reflector 2 is important for the optical action of the identification element when viewed through the polarisation filter, the reflector here being a holographic reflector, more specifically a film carrying a white light hologram, as available in various variants, for example, from the Polaroid company under the name LIFT.

Further details of the embodiment shown in FIG. 1 will be found below.

The orientation layer 3 is a so-called "linearly photopolymerised" (LPP) orientation layer, sometimes also referred to as "photo-oriented polymer networks" (PPN), which is differently oriented in different areas. Suitable materials for this purpose are inter alia cinnamic acid derivatives, as described, for example, in the published specifications EP-A-525 478 and U.S. Pat. No. 5 389 698. The orienting and simultaneous crosslinking thereof is effected in known manner by selective irradiation with linearly polarised UV light.

The preparation can be carried out, for example, as follows: the LPP material used is

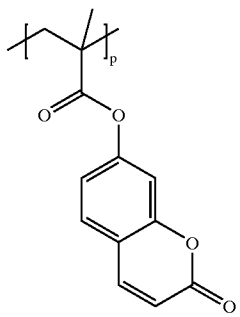

Poly[1-methyl-1-(2-oxo-2H-1-benzopyran-7-yloxycarbonyl)-ethylene]

A synthesis procedure is described under Example 1 of International Patent Application WO-96/10049. The reflector 2 is coated by spin-coating with a 3% solution of the LPP material in a solvent, for example N-methylpyrrolidone (NMP), for one minute at 2000 rev/min. The layer is then dried for 30 minutes on a hotplate at 130° C. The orienting and crosslinking can then be produced by irradiation with the linearly polarised light of a 200W extra high pressure mercury vapour lamp for approximately 5 minutes at room temperature. If, during that procedure, some regions are irradiated with a certain polarisation direction and other regions with a polarisation direction rotated relative thereto, the pattern obtained will have regions of different orientation.

An optically anisotropic layer with preferred directions, in the form of an anisotropic layer of crosslinked liquid crystal monomers, forms the retarder layer 4. This LCP layer (LCP=Liquid Crystal Polymer) has a molecular arrangement the orientation of which has been preset by the orientation of the underlying orientation layer 3.

The following diacryl components, for example, may be used as crosslinkable liquid crystal monomers for the LCP layer:

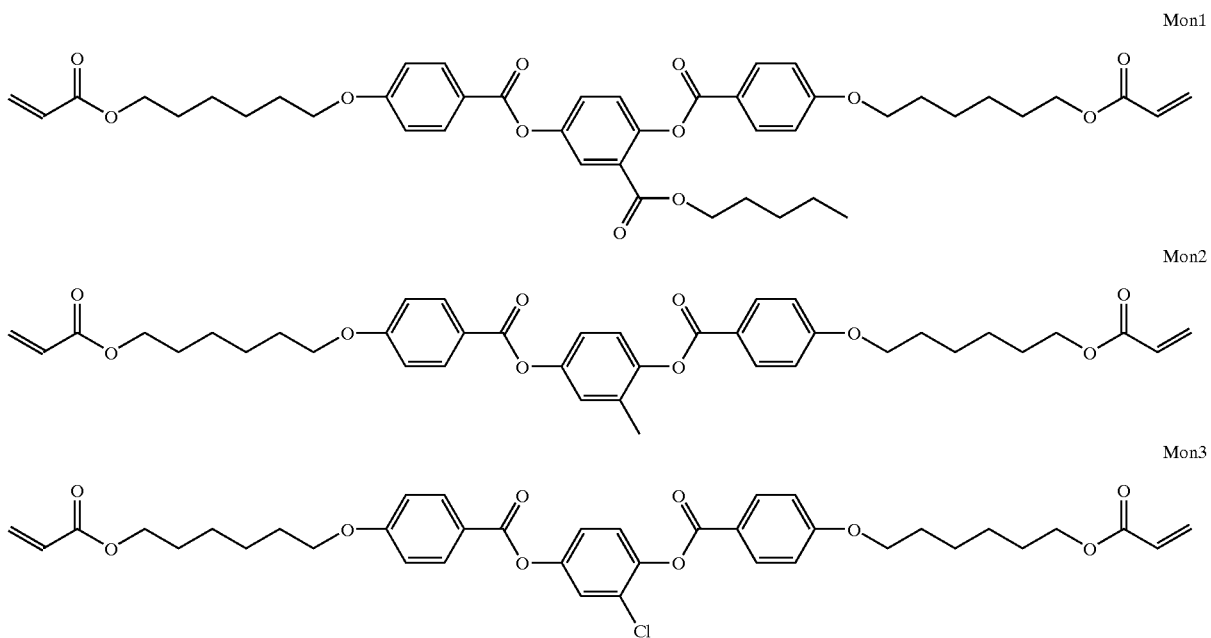

When composed of 80% Mon1, 15% Mon2 and 5% Mon3, these diacrylate monomers yield a supercoolable, nematic mixture having a low melting point (Tm~35° C.) that allows the preparation of the LCP layer to be carried out at room temperature. By adding 2% of the photoinitiator Irgacure 369 from Ciba-Geigy ("Irgacure" is a Trade Mark) it is possible to accelerate the subsequent crosslinking process. If this mixture is dissolved in anisole it can be applied to the orientation layer by spin-coating, the LCP layer thickness being adjustable within a wide range especially by way of the concentration of the solution. For the crosslinking of the liquid crystal monomers, it is then possible to carry out irradiation with isotropic light from a 200W extra high pressure mercury vapour lamp for about 1 minute in an inert atmosphere.

FIG. 2 shows a further possible layer structure for an identification element according to the invention. The reference numeral 10 indicates a reflector which can be of the same construction as in FIG. 1. In contrast to FIG. 1, in this variant two orientation/retarder layer pairs are arranged one above the other, namely a first orientation layer 11, a first retarder layer 12, a second orientation layer 13 and a second retarder layer 14. With this configuration it is possible to produce a multicoloured pattern when, in addition to different optical axes in different regions of the same retarder layer, also the orientations of the optical axes of regions lying above one another in the retarder layers 12 and 14 are differently combined. For this purpose the two retarder layers advantageously have non-identical optical retardation.

An example of different combinations of the relative orientation of the optical axes of regions lying above one another in the retarder layers 12 and 14, with which a different colour can be obtained for each combination, is shown in the diagram of FIG. 3.

What is claimed is:

1. An optical identification element, comprising at least one optically anisotropic layer, which layer is formed with a layer of cross-linked liquid-crystalline monomers, oligomers or polymers and comprises at least two regions having different molecular orientation, and a layer that is at least partially reflective, wherein the at least partially reflective layer is a holographic reflector.

2. The optical identification element according to claim 1, wherein the reflector is substantially achromatic.

3. The optical identification element according to claim 1, wherein the reflector is transflective or partially transparent.

4. The optical identification element according to claim 1, wherein said optical identification element further comprises an orientation layer for liquid crystal molecules.

5. The optical identification element according to claim 4, wherein the orientation layer is formed from a linearly photopolymerised polymer network.

6. The optical identification element according to claim 1, wherein said optical identification element further comprises:

a first optically anisotropic layer formed with a layer of crosslinked liquid-crystalline monomers, oligomers or polymers and comprising at least two regions having different molecular orientation;

a first orientation layer for liquid crystal molecules;

a second optically anisotropic layer formed with a layer of crosslinked liquid-crystalline monomers, oligomers or polymers and comprising at least two regions having different molecular orientation; and a second orientation layer for liquid crystal molecules.

7. An item protected against forgery and/or copying, said item comprising an optical component according to claim 1.

8. A method for checking an item according to claim 7 for authenticity, said method comprising passing light through a polariser onto the optical component and viewing the reflected light from the at least partially reflective layer through the polariser.

* * * * *

UNITED STATES PATENT AND TRADEMARK OFFICE
CERTIFICATE OF CORRECTION

PATENT NO.    : 6,496,287 B1
DATED         : December 17, 2002
INVENTOR(S)   : Seiberle et al.

It is certified that error appears in the above-identified patent and that said Letters Patent is hereby corrected as shown below:

Title page,
Item [22], PCT filing date, "Apr. 4, 1999" should read -- Apr. 6, 1999 --.
Item [30], Foreign Application Data, "Jul 9, 1998" should read -- Apr. 9, 1998 --.

Signed and Sealed this

First Day of April, 2003

JAMES E. ROGAN
*Director of the United States Patent and Trademark Office*